Oct. 18, 1938.  G. S. BAXTER  2,133,339
BREAD WRAPPING MACHINE
Filed March 7, 1934
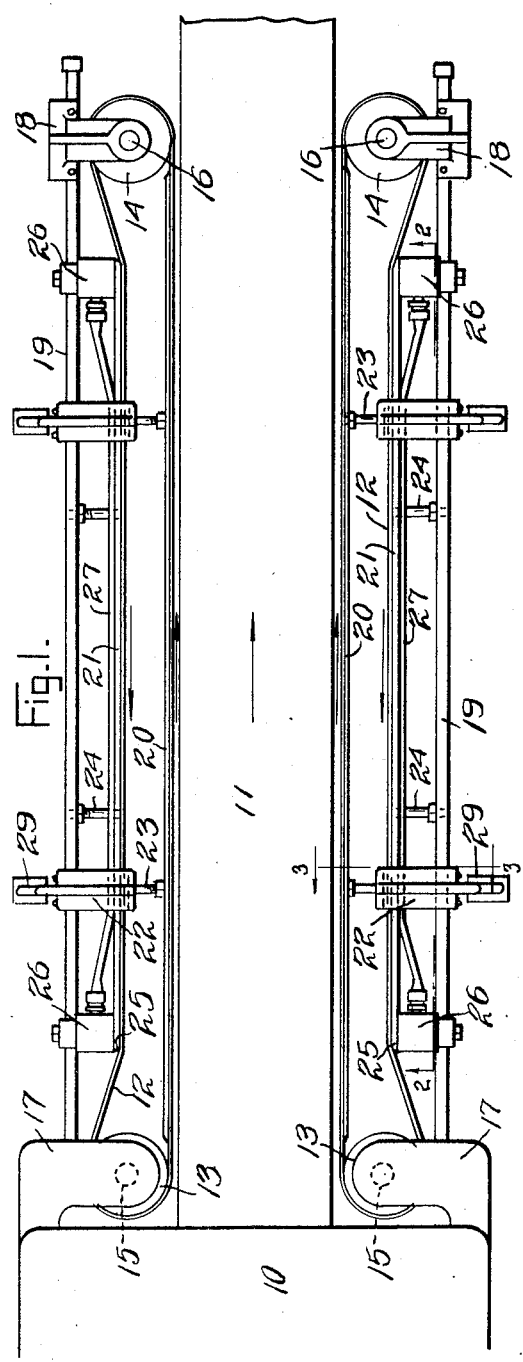
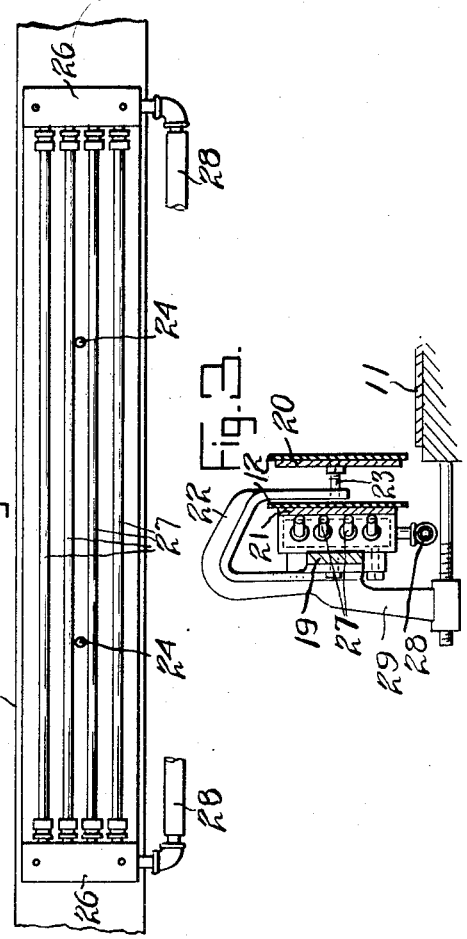
Inventor
Gustave S. Baxter Patented Oct. 18, 1938

2,133,339

UNITED STATES PATENT OFFICE 2,133,339

BREAD WRAPPING MACHINE

Gustave S. Baxter, Detroit, Mich., assignor, by mesne assignments, to American Machine and Foundry Company Application March 7, 1934, Serial No. 714,508

11 Claims. (Cl. 93—2)

This invention relates to bread wrapping machines of the type employed where a waxed paper wrapper is applied to the loaves and the ends sealed by the wax carried on the paper. Considerable difficulty has been experienced in hot weather in getting a perfect seal on machine wrapped breads, especially the long sliced sandwich loaf. The combination of the warm bread, the hot wax and high room temperature causes the pressure belts to become so hot that the wax would not set properly, thus resulting in the wrappers not being sealed at the ends of the loaves. The object, therefore, of this invention is to provide means for cooling the wax seals to insure proper sealing of the wrapper after the wax has been heated.

Referring to the accompanying drawing, which is made a part hereof and on which similar reference characters indicate similar parts, Figure 1 is a plan view of the machine showing the cooling apparatus applied thereto.

Figure 2 is a section on line 2—2 of Figure 1, and

Figure 3 is a section on line 3—3 of Figure 1.

In the drawing reference character 10 indicates a conventional bread wrapping machine with a conveyor belt 11 extending therefrom. Pressure belts 12 positioned on each side of the conveyor belt 11 are mounted on spaced pulleys 13 and 14. The pulleys 13 and 14 are positioned on the vertical shafts 15 and 16 mounted in suitable supports 17 and 18. The outer supports 18 are adjustably mounted on the shafts 19 for tensioning the belts 12. The conveyor belt 11 and the pressure belts 12 are driven by suitable mechanism, not shown.

A pressure board or plate 20 formed of any suitable material, preferably brass, is positioned against the belt 12 to hold it in contact with the ends of the wrapped loaves of bread. A similar pressure board or plate 21 is likewise positioned against the outer surface of the belt 12. The board 20 is held in position by means of the spaced clamps 22 fixed to the shaft 19, being adjusted with respect to the clamps 22 by the bolts and nuts 23 on the ends of the clamps. The other board 21 is held in adjusted position by the bolts and nuts 24 attached to the shaft 19. The ends 25 of the pressure board 21 are beveled to prevent undue wear on the belt 12 as it travels along the board.

Cooling means comprising the headers 26 fixed by any suitable means to the shaft 19 intermediate the pressure board 21 and the shaft are provided at each end and are connected by a series of cooling tubes 27 adapted to be positioned along the board 21 for cooling the belt 12 as it moves along the board. The headers are provided with connections 28 adapted to be connected to a refrigerating system for circulating a cooling medium through the headers and tubes.

The entire structure thus defined except the machine 10 and the conveyor belt 11 is supported by means of the arms 29 which are fixed to the shafts 19 and mounted on suitable mechanism to permit the structure on each side of the belt 11 to be moved to and from each other depending on the length of the loaves or articles being wrapped. The arms 29 are of sufficient height and are curved to permit the mechanism to be moved over the belt 11 to accommodate rather short length articles.

The operation of the mechanism above described is quite obvious, the belts 12 are spaced apart according to the length of the loaves being wrapped. Loaves of bread are wrapped by the wrapping machine and are then projected on the moving conveyor belt 11 with the ends of the loaves in contact with the belts 12. As the loaves travel along the conveyor belt with the ends in contact with the belts 12 which are chilled by contact with the pressure boards, the wax is hardened quickly even though the surrounding temperature conditions are very high. Brine or some other suitable refrigerating medium is circulated through the tubes to maintain the pressure boards in chilled condition.

It may be readily seen therefore, that by the use of refrigerating tubes a more perfect and satisfactory sealing operation is afforded. The mechanism described is rather simple, quite flexible in use and may be employed for various other purposes, other than wrapping bread, as for wrapping any articles or package requiring a waxed paper wrapper where a perfect seal is desired.

Having thus fully described my said invention, what I claim as new and desire to secure by Letters Patent, is:

1. Cooling mechanism for a wrapping machine comprising means for conveying the wrapped article bearing hot seals, pressure belts contacting the ends of said article to cool the hot seals, and refrigerating means including plate members having contact surfaces in contact with said belts along a considerable portion of the length thereof and engaging the article-contacting face thereof for chilling same to insure a perfect seal, said cooling means being adjustable toward and away from the articles to accommodate articles of various lengths.

2. A bread wrapper seal cooling mechanism comprising a belt conveyor, laterally adjustable endless belts positioned along the edges of said belt conveyor at right angles thereto adapted to engage the ends of a wrapped loaf of bread for cooling the hot seals, rigid means for maintaining the loaf-contacting portion of said belts in position and refrigerating coils mounted adjacent another portion of said belts to maintain them in a chilled condition for properly sealing the wrapped loaves of bread.

3. The combination with a bread wrapping machine of a conveyor for receiving the wrapped loaves bearing hot seals, belts positioned along the edges of said conveyor contacting the ends of said loaves for cooling same, pressure means for maintaining said belts in contact therewith, and refrigerating means positioned adjacent portions of the belts remote from the said pressure means for chilling said belts to insure proper setting of the hot seals.

4. In sealing equipment of the character described, a pair of refrigerated cooling plates, an endless belt associated with each of said plates respectively, and rigidly mounted members disposed to divert an intermediate length of one stretch of each belt toward the other stretch thereof to provide space for the associated plate.

5. The combination with a set of traveling members arranged to engage heated seals of packages and absorb heat therefrom, of stationary plates engaging the operating faces of said members, and means for chilling said plates whereby the operating faces of said members will slide over said plates and the heat absorbed by said members from the heated package seals will be dissipated by said means.

6. The combination with a set of traveling endless belts, of separate sets of pulleys over which said belts are trained, one run of each belt being arranged to engage heated seals on the opposite ends of a package and absorb heat therefrom, and refrigerating means engaging and chilling the inoperative runs of said belts whereby the heat absorbed by the same from the heated package seals will be dissipated.

7. The combination with a set of traveling endless belts arranged to engage the seals of heat sealed packages to chill and set the same, and dry cooling elements engaging the package contacting operating faces only of said belts to cool the same.

8. The combination with a set of traveling endless belts arranged to engage the seals of heat sealed packages to chill and set the same, and dry cooling elements engaging the package contacting operating faces only of said belts to cool the same, said cooling elements comprising tanks having a wall engaging said faces of the belts, and means for circulating a cooling medium through said tanks.

9. A delivery runway for wrapping machines having heat sealing means comprising a set of dry traveling endless flexible members arranged to engage the seals of the heat sealed packages to chill and set the same, and cooling means engaging package contacting faces only of said members.

10. The combination with a set of dry traveling endless flexible members having operating runs arranged to engage the seals of heat sealed packages and having returning non-operating runs, and cooling means engaging the operating faces only of the non-operating runs of said members.

11. The combination with a set of traveling members arranged to engage heated seals of packages and absorb heat therefrom, of stationary means engaging the operating faces of said members and cooling the same whereby the operating faces of said members will slide over said means and the heat absorbed by the same from the heated package seals will be dissipated.

GUSTAVE S. BAXTER.